(12) United States Patent
Lee

(10) Patent No.: US 8,684,029 B2
(45) Date of Patent: Apr. 1, 2014

(54) CHECK VALVE OF HYDRAULIC BRAKE SYSTEM

(75) Inventor: Chung Jae Lee, Gyeonggi-do (KR)

(73) Assignee: Mando Corporation, Gyeonggi-Do (KR)

( * ) Notice: Subject to any disclaimer, the term of this patent is extended or adjusted under 35 U.S.C. 154(b) by 113 days.

(21) Appl. No.: 13/416,634

(22) Filed: Mar. 9, 2012

(65) Prior Publication Data

US 2012/0227840 A1    Sep. 13, 2012

(30) Foreign Application Priority Data

Mar. 11, 2011  (KR) .......................... 10-2011-0021773
Mar. 23, 2011  (KR) .......................... 10-2011-0025722

(51) Int. Cl.
*F16K 15/00*       (2006.01)
(52) U.S. Cl.
USPC .......................................................... 137/539
(58) Field of Classification Search
USPC ....................................... 137/539, 454.2, 540
See application file for complete search history.

(56) References Cited

U.S. PATENT DOCUMENTS

| | | | | |
|---|---|---|---|---|
| 1,931,918 A | * | 10/1933 | Bard ........................... | 184/105.3 |
| 3,554,223 A | * | 1/1971 | Shea ............................. | 137/539 |
| 3,725,990 A | * | 4/1973 | Petersen et al. ........... | 29/890.122 |
| 4,295,412 A | * | 10/1981 | Hachiro ......................... | 91/468 |
| 4,365,648 A | * | 12/1982 | Grothe ......................... | 137/539 |
| 4,675,003 A | * | 6/1987 | Hooven ............................ | 604/9 |
| 5,967,180 A | * | 10/1999 | Yates, III ....................... | 137/539 |
| 6,209,527 B1 | * | 4/2001 | Bueser et al. .................. | 123/514 |
| 6,805,157 B2 | * | 10/2004 | Nakazawa et al. ............ | 137/540 |
| 7,395,836 B2 | * | 7/2008 | Krebs et al. .................... | 137/539 |
| 2010/0276623 A1 | * | 11/2010 | Talaski .......................... | 251/337 |

FOREIGN PATENT DOCUMENTS

KR    10-2002-0021134      3/2002
KR    10-2006-0100101 A    9/2006

OTHER PUBLICATIONS

Korean Office Action issued in Korean Patent Application No. KR 10-2011-0021773 dated Aug. 10, 2012.

* cited by examiner

*Primary Examiner* — Elizabeth Houston
*Assistant Examiner* — David Colon Morales
(74) *Attorney, Agent, or Firm* — McDermott Will & Emery LLP

(57) ABSTRACT

Disclosed is a check valve of a hydraulic brake system. The check valve includes a valve housing which includes a tapered front end having a smaller diameter than a middle end, the cylindrical middle end extending from the front end by a predetermined length to allow the ball and spring to be accommodated within the middle end, a rear end stepped from the middle end to have a greater diameter than the middle end, and a flange circumferentially bent from the rear end to have a greater diameter than the rear end, and a valve seat having an outer diameter equal to an inner diameter of the rear end so as to be press-fitted into the rear end of the valve housing. The check valve having a simplified configuration achieves size and weight reduction and is manufactured at low cost and high processing efficiency using pressing.

6 Claims, 4 Drawing Sheets

CHECK VALVE OF HYDRAULIC BRAKE SYSTEM

CROSS-REFERENCE TO RELATED APPLICATIONS

This application claims the benefit of Korean Patent Applications No. 2011-0021773, filed on Mar. 11, 2011 and No. 2011-0025722, filed on Mar. 23, 2011 in the Korean Intellectual Property Office, the disclosure of which is incorporated herein by reference.

BACKGROUND

1. Field

Embodiments of the present invention relate to a check valve of a hydraulic brake system having a simplified configuration to ensure easy processing and assembly.

2. Description of the Related Art

A vehicle is essentially provided with a brake system for braking. Recently, a variety of brake systems to achieve stronger and stabilized brake force has been proposed. Examples of brake systems include an Anti-lock Brake System (ABS) that prevents wheel slip during braking, a Brake Traction Control System (BTCS) that prevents sudden unintended acceleration of a vehicle or slip of driving wheels upon sudden acceleration, and a Vehicle Dynamic Control System (VDCS) that is a combination of an ABS and BTCS and stably maintains traveling of a vehicle by controlling brake oil pressure.

Such an electronically controlled brake system includes a plurality of solenoid valves to control hydraulic brake pressure transmitted to hydraulic brakes mounted to wheels of a vehicle, a pair of low-pressure and high-pressure accumulators in which oil discharged from the hydraulic brakes is temporarily stored, a motor and pump to forcibly pump the oil of the low-pressure accumulator, a plurality of check valves to prevent backflow of oil, and an Electronic Control Unit (ECU) to control operations of the solenoid valves and motor. These components are accommodated in a compact aluminum hydraulic block.

FIG. 1 is a sectional view illustrating a check valve used in a conventional electronically controlled brake system. In one example, a check valve, which is installed in a path between a suction side of a pump and a low-pressure accumulator, functions to prevent oil of a master cylinder from being transmitted to the low-pressure accumulator and also, to prevent oil of a wheel cylinder from entering the suction side of the pump when a motor is driven to operate the pump.

As illustrated, a check valve 1 includes a valve housing 3 press-fitted into a hydraulic block 2 having an oil path 2a, a ball 4 accommodated in the valve housing 3 to open or close an oil passage 3a defined in the valve housing 3, a spring 5 to elastically support the ball 4 toward the oil passage 3a, and a spring seat 6 assembled into the valve housing 3 to guide the spring 5.

The above-described conventional check valve 1, however, has a complicated external appearance and is difficult to assemble because only functionality is considered upon manufacture thereof. In particular, the valve housing 3 having a complicated shape as illustrated causes a large product size and expensive manufacturing costs because it is manufactured only by cutting. In addition, since the spring seat 6 is press-fitted only into the valve housing 3, assembly reliability is deteriorated after long-term use.

SUMMARY

Therefore, it is an aspect of the present invention to provide a check valve of a hydraulic brake system having a simplified configuration to ensure easy processing and assembly.

Additional aspects of the invention will be set forth in part in the description which follows and, in part, will be obvious from the description, or may be learned by practice of the invention.

In accordance with one aspect of the present invention, a check valve of a hydraulic brake system includes a valve housing press-fitted into an inner stepped portion of a perforated hydraulic block, the valve housing defining an inner oil passage, a ball accommodated in the valve housing to open or close the inner oil passage, a spring to elastically support the ball, and a valve seat coupled to the valve housing to guide the spring, wherein the valve housing includes a tapered front end having a smaller diameter than a middle end, the cylindrical middle end extending from the front end by a predetermined length to allow the ball and spring to be accommodated within the middle end, a rear end stepped from the middle end to have a greater diameter than the middle end, and a flange circumferentially bent from the rear end to have a greater diameter than the rear end, and wherein the valve seat has an outer diameter equal to an inner diameter of the rear end so as to be press-fitted into the rear end of the valve housing, the valve seat including an oil hole penetrating the interior thereof.

The perforated block may further include an outer stepped portion, and the outer stepped portion may be press-deformed to fix the rear end and flange of the valve housing press-fitted into the inner stepped portion.

The valve seat of the check valve may be supported at rear both sides thereof by a stepped surface of the inner stepped portion of the perforated block.

In accordance with another aspect of the present invention, a check valve of a hydraulic brake system includes a valve housing press-fitted into an inner stepped portion of a perforated hydraulic block, the valve housing defining an inner oil passage, a ball accommodated in the valve housing to open or close the inner oil passage, a spring to elastically support the ball, and a valve seat coupled to the valve housing to guide the spring, wherein the valve housing includes a tapered front end having a smaller diameter than a middle end, the cylindrical middle end extending from the front end by a predetermined length to allow the ball and spring to be accommodated within the middle end, and a rear end stepped from the middle end to have a greater diameter than the middle end, and wherein the valve seat includes a seat head press-fitted into the middle end of the valve housing, a seat body press-fitted into the tapered rear end of the valve housing, and a seat tail press-fitted into the inner stepped portion of the perforated block.

The valve seat of the check valve may be supported at rear both sides thereof by corners of the inner stepped portion of the perforated block.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
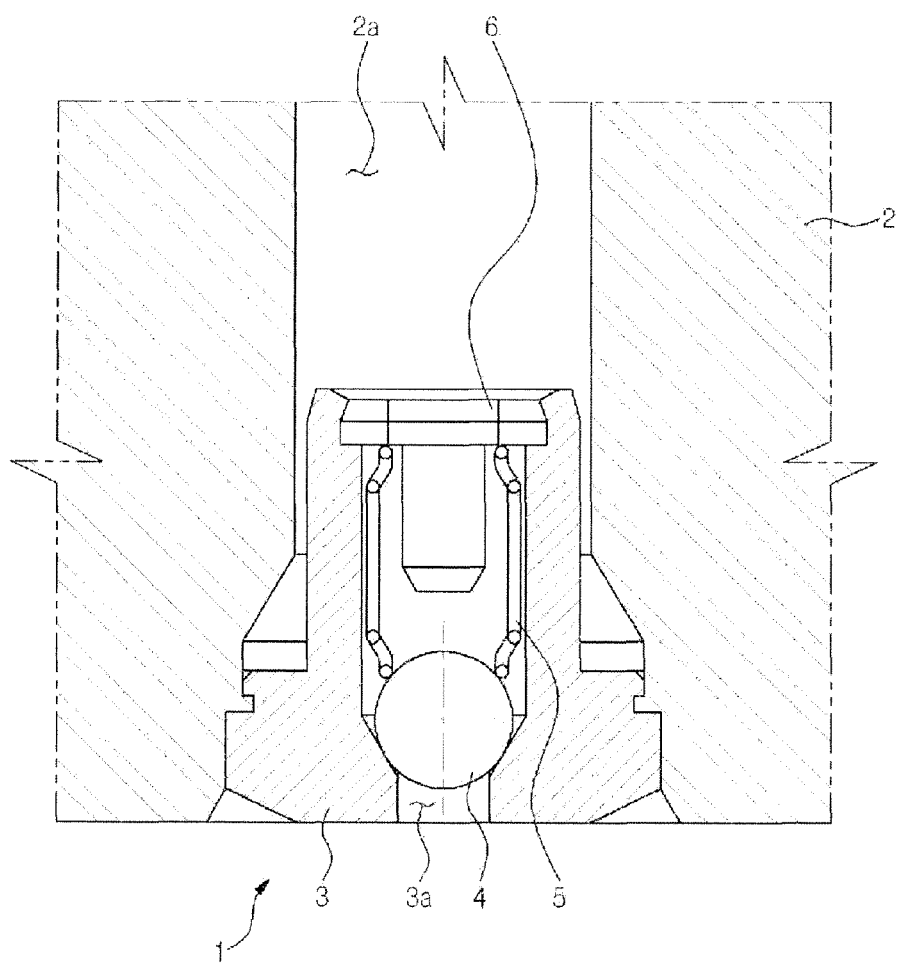
FIG. 1 is a view illustrating a check valve of a conventional brake system.

Reference will now be made in detail to the embodiment of the present invention, examples of which are illustrated in the accompanying drawings, wherein like reference numerals refer to like elements throughout.

First, prior to explaining a check valve of a brake system according to an embodiment of the present invention, a brake system using a check valve will be described in brief.

Figure 2:
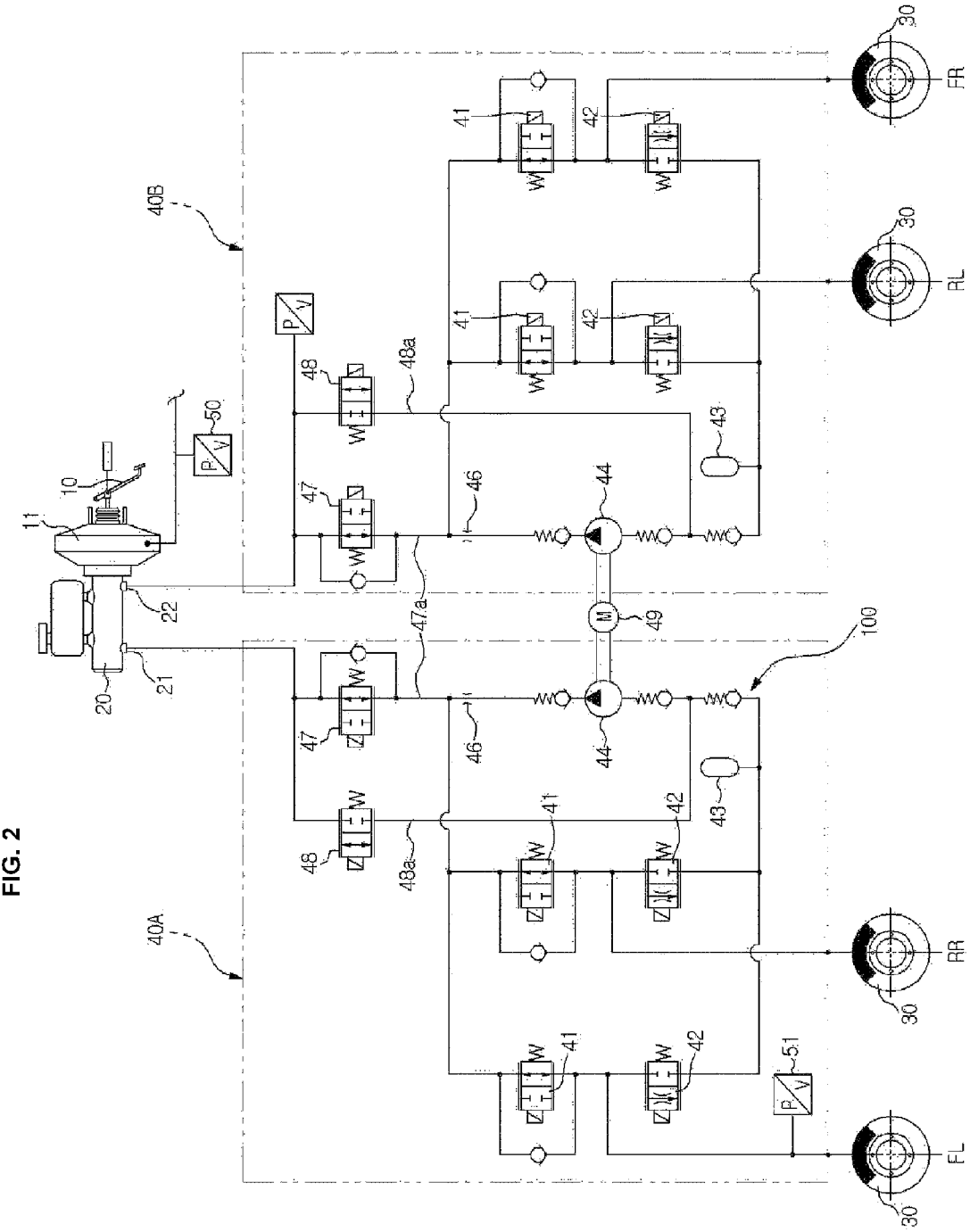
FIG. 2 is a view illustrating a brake system using a check valve according to an embodiment of the present invention.

FIG. 2 is a view illustrating a conventional brake system. The electronically controlled brake system includes a brake pedal 10 to which operating force is applied by a driver, a brake booster 11 to double pedal force of the brake pedal 10 using a pressure difference between vacuum pressure and air pressure, a master cylinder 20 to generate pressure under assistance of the brake booster 11, a first hydraulic circuit 40A which connects a first port 21 of the master cylinder 20 to two wheel brakes (or wheel cylinders) 30 and controls transmission of oil pressure, and a second hydraulic circuit 40B which connects a second port 22 of the master cylinder 20 to the other two wheel brakes 30 and controls transmission of oil pressure. The first hydraulic circuit 40A and the second hydraulic circuit 40B are installed in a compact hydraulic block (not shown).

Each of the first hydraulic circuit 40A and the second hydraulic circuit 40B includes solenoid valves 41 and 42 to control hydraulic brake pressure to be transmitted to the two wheel brakes 30, a pump 44 to suction and pump oil discharged from the wheel brakes 30 or oil directed from the master cylinder 20, a low-pressure accumulator 43 in which the oil discharged from the wheel brakes 30 is temporarily stored, an orifice 46 to reduce pressure pulsation of oil pumped from the pump 40, and an auxiliary flow line 48a to guide suction of oil from the master cylinder 20 to an entrance of the pump 44 in a Traction Control (TCS) mode.

The plurality of solenoid valves 41 and 42 are arranged upstream and downstream of the wheel brakes 30. Specifically, the solenoid valves include a normal open type solenoid valve 41 which is placed upstream of each wheel brake 30 and is normally kept open, and a normal close type solenoid valve 42 which is placed downstream of each wheel brake 30 and is normally kept closed. Opening/closing operations of the solenoid valves 41 and 42 are controlled by an Electronic Control Unit (ECU: not shown) that senses a vehicle speed via a wheel speed sensor installed to each wheel. In a dump mode, the normal close type solenoid valve 42 is opened and the oil discharged from the wheel brake 30 is temporarily stored in the low-pressure accumulator 43.

The pump 44 is driven by a motor 49 and serves to suction the oil stored in the low-pressure accumulator 43 and discharge the oil to the orifice 46, thereby transmitting oil pressure to the wheel brake 30 or the master cylinder 20.

A main flow line 47a, which connects the master cylinder 20 and an exit of the pump 44 to each other, is provided with a normal open type solenoid valve 47 for traction control (hereinafter referred to as TC valve). The TC valve 47 is normally kept open to transmit brake oil pressure generated in the master cylinder 20 to the wheel brake 30 through the main flow line 47a upon normal braking via the brake pedal 10.

The auxiliary flow line 48a is branched from the main flow line 47a and guides suction of oil from the master cylinder 20 to the entrance of the pump 44. A shuttle valve 48 is installed on the auxiliary flow line 48a to make sure that the oil flows only to the entrance of the pump 44. The electrically operated shuttle valve 48 is installed on a certain position of the auxiliary flow line 48a and is normally closed and is opened in a TCS mode.

The brake booster 11 is provided with a pressure sensor 50 to sense air pressure and vacuum pressure of the brake booster 11. Also, wheel pressure sensors 51 are provided to sense actual brake pressure applied to front left and right wheels FL and FR and rear left and right wheels RL and RR. These pressure sensors 50 and 51 are electrically connected to and controlled by the ECU.

A braking operation of the vehicular hydraulic brake system having the above-described configuration according to the embodiment of the present invention is as follows.

First, the driver will push the brake pedal 10 when it is necessary to reduce a vehicle speed during traveling or keep a vehicle stationary after stopping. The brake booster 11 doubles input force from the brake pedal 10, thereby assisting the master cylinder 20 in generating great hydraulic brake pressure. The generated hydraulic brake pressure is transmitted to the front wheels FR and FL and the rear wheels RL and RR via the solenoid valves 41 and 42, realizing a braking operation. Then, if the driver gradually or completely removes their foot from the brake pedal 10, oil pressure in each wheel brake is returned to the master cylinder 20 via the solenoid valves 41 and 42, causing reduction or complete removal of brake force.

Figure 3:
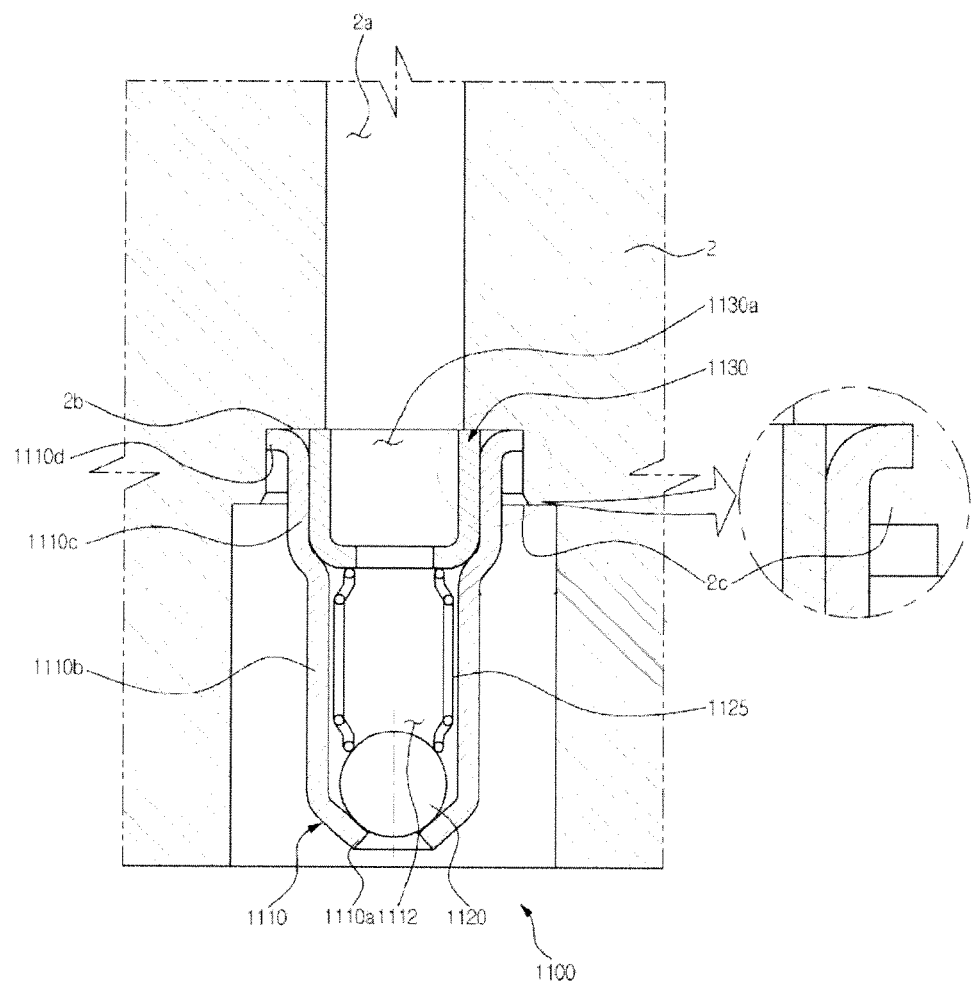
FIG. 3 is a view illustrating a check valve of a brake system according to one embodiment of the present invention.

FIG. 3 is a view illustrating a check valve of a brake system according to one embodiment of the present invention. Although a check valve 1100 of the present embodiment is installed between a suction side of the low-pressure accumulator 43 and the pump 44 in FIG. 2, an installation position of the check valve 1100 is not limited thereto.

As illustrated, the check valve 1100 of the present embodiment includes a valve housing 1110 which is press-fitted into the hydraulic block (2, see FIG. 1) and defines an oil passage 1112 therein, a ball 1120 accommodated in the valve housing 1110 to open or close the oil passage 1112 of the valve housing 1110, a spring 1125 to elastically support the ball 1120, and a valve seat 1130 assembled to the valve housing 1110 to guide the spring 1125.

The hydraulic block 2, to which the check valve 1100 of the present embodiment is installed, has a hollow bore 2a to define an oil path therein. The bore 2a defining the oil path is stepped such that a diameter thereof gradually increases outward. The bore 2a includes an inner stepped portion 2b and an outer stepped portion 2c. In the present embodiment, the check valve 1100 is installed between the inner stepped portion 2b and the outer stepped portion 2c.

The valve housing 1110 has a cylindrical multi-stage tower shape. For example, the valve housing 1110 includes a tapered front end 1110a having a smaller diameter than another region (middle end), a cylindrical middle end 1110b extending from the front end 1110a by a predetermined length to allow the ball 1120 and spring 1125 to be accommodated within the middle end 1110b, a rear end 1110c stepped from the middle end 1110b to have a greater diameter than the middle end 1110b, and a flange 1110d circumferentially bent from the rear end 1110c to have a greater diameter than the rear end 1110c. The valve housing 1110 has a more simplified configuration than the related art and may be manufactured at low cost by pressing or forging. The oil passage 1112 longitudinally penetrates the front end 1110a, middle end 1110b, rear end 1110c and flange 1110d.

The valve seat 1130 is manufactured by cold forging. The valve seat 1130 is coupled to the rear end 1110c of the valve housing 1110 while being coupled to and supported by a stepped surface of the inner stepped portion 2b of the perforated block 2. To this end, the valve seat 1130 includes a cylindrical seat body whose outer diameter is equal to an inner diameter of the rear end 1110c such that the valve seat 1130 is installed to the rear end 1110c of the valve housing 1110. The valve seat 1130 has an oil hole 1130a penetrating the body thereof.

The ball 1120 installed in the valve housing 1110 opens or closes a through-hole of the front end 1110a of the valve housing 1110. The spring 1125 is compressively interposed between the ball 1120 and a front end of the valve seat 1130.

In the case of the check valve 1100 in which the ball 1120, spring 1125 and valve seat 1130 are assembled to the valve housing 1110 as described above, after the valve seat 1130 is pushed to the inner stepped portion 2b of the perforated block 2, as illustrated in FIG. 3 in enlarged view, the outer stepped portion 2c located outward of the flange 1110d of the valve housing 1110 is press-deformed to surround the rear end 1110c and flange 1110d of the valve housing 1110 using an assembly tool (not shown). In this way, the check valve 1100 is fixed to the perforated block 2.

Accordingly, the check valve 1100 of the present embodiment may be easily manufactured and processed owing to changing the shapes of the valve housing 1110 and the valve seat 1130. Moreover, as a result of the flange 1110d of the valve housing 1110 and the valve seat 1130 being supported at both front and rear sides thereof by the perforated block 2, the check valve 1100 achieves easy fixing and assembly thereof.

Figure 4:
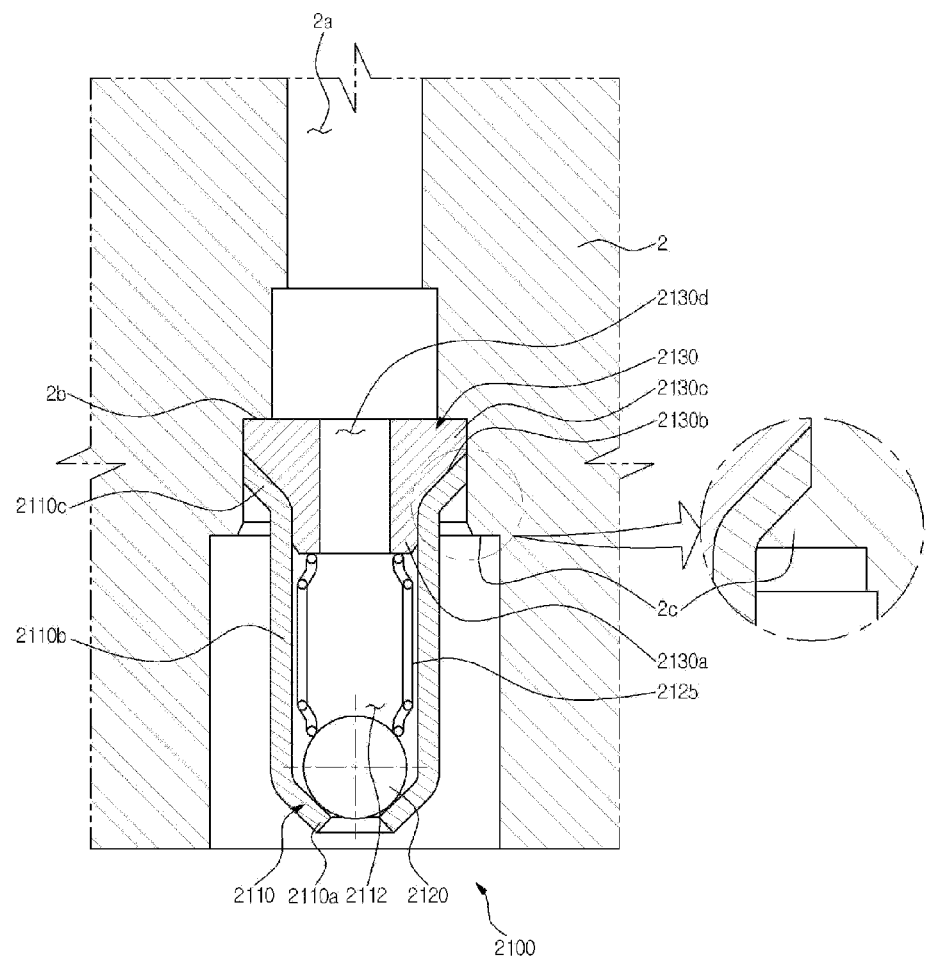
FIG. 4 is a view illustrating a check valve of a brake system according to another embodiment of the present invention.

FIG. 4 is a view illustrating a check valve of a brake system according to another embodiment of the present invention. In the present embodiment, a check valve 2100 includes a valve housing 2110 which is press-fitted into the hydraulic block (2, see FIG. 1) and defines an oil passage 2112, a ball 2120 accommodated in the valve housing 2110 to open or close the oil passage 2112 of the valve housing 2110, a spring 2125 to elastically support the ball 2120, and a valve seat 2130 assembled to the valve housing 2110 to guide the spring 2125.

The hydraulic block 2, to which the check valve 2100 of the present embodiment is installed, has the hollow bore 2a to define an oil path therein. The bore 2a defining the oil path is stepped such that a diameter thereof gradually increases outward. The bore 2a includes the inner stepped portion 2b and the outer stepped portion 2c. In the present embodiment, the check valve 2100 is installed between the inner stepped portion 2b and the outer stepped portion 2c.

The valve housing 2110 has a cylindrical multi-stage tower shape. For example, the valve housing 2110 includes a tapered front end 2110a having a smaller diameter than another region (middle end), a cylindrical middle end 2110b extending from the front end 2110a by a predetermined length to allow the ball 2120 and spring 2125 to be accommodated within the middle end 2110b, and a tapered rear end 2110c whose diameter increases with increasing distance from the middle end 1110b. The valve housing 2110 has a more simplified configuration than the related art and may be manufactured at low cost by pressing or forging. The oil passage 2112 longitudinally penetrates the front end 2110a, middle end 2110b and rear end 2110c.

The valve seat 2130 is manufactured by cold forging. The valve seat 2130 is coupled to the rear end 2110c of the valve housing 2110 while being coupled to corners of the inner stepped portion 2b of the perforated block 2. To this end, the valve seat 2130 includes a seat head 2130a press-fitted into the middle end 2110b of the valve housing 2110, a seat body 2130b press-fitted into the tapered rear end 2110c of the valve housing 2110, and a seat tail 2130c press-fitted into the inner stepped portion 2b of the perforated block 2. Specifically, the seat head 2130a has an outer diameter equal to an inner diameter of the middle end 2110b of the valve housing 2110, the seat body 2130b has an inclination equal to that of the tapered rear end 2110c of the valve housing 2110, and the seat tail 2130c has the same shape as the corners of the inner stepped portion 2b of the perforated block 2. The valve seat 2130 has an oil hole 2130d penetrating the seat head 2130a, seat body 2130b and seat tail 2130c thereof.

The ball 2120 installed in the valve housing 2110 opens or closes a through-hole of the front end 2110a of the valve housing 2110. The spring 2125 is compressively interposed between the ball 2120 and the seat head 2130a of the valve seat 2130.

In the case of the check valve 2100 in which the ball 2120, spring 2125 and valve seat 2130 are assembled to the valve housing 2110 as described above, after the valve seat 2130 is pushed to the corners of the inner stepped portion 2b of the perforated block 2, as illustrated in FIG. 4 in enlarged view, the outer stepped portion 2c is press-deformed to surround the rear end 2110c of the valve housing 2110 using an assembly tool (not shown). In this way, the check valve 2100 is stably fixed to the perforated block 2.

Accordingly, the check valve 2100 of the present embodiment may be easily manufactured and processed owing to changing the shapes of the valve housing 2110 and the valve seat 2130. Moreover, as a result of the rear end 2110c of the valve housing 2110 and the seat tail 2130c of the valve seat 2130 being supported at both front and rear sides thereof by the perforated block 2, the check valve 2100 achieves easy fixing and assembly thereof. As compared to the valve seat 1130 of the above-described embodiment, the valve seat 2130 having the seat tail 2130c of the present embodiment has a greater area supported by the perforated block, thus having higher assembly efficiency and durability.

As is apparent from the above description, a check valve of a hydraulic brake system according to one aspect has a simplified configuration in which the valve housing includes a tapered front end having a smaller diameter than a middle end, the cylindrical middle end extending from the front end by a predetermined length to allow the ball and spring to be accommodated within the middle end, a rear end stepped from the middle end to have a greater diameter than the middle end, and a flange circumferentially bent from the rear end to have a greater diameter than the rear end, and the valve seat has an outer diameter equal to an inner diameter of the rear end so as to be press-fitted into the rear end of the valve housing, the valve seat including an oil hole penetrating the interior thereof, whereby the check valve achieves size and weight reduction and is manufactured at low cost and high processing efficiency because it may be manufactured using conventional pressing. Furthermore, as a result of the flange of the valve housing and the valve seat being supported at both front and rear sides thereof by the perforated block, the check valve achieves easy fixing and assembly thereof, resulting in enhanced assembly reliability.

According to another aspect, a check valve of a hydraulic brake system has a simplified configuration in which the valve housing includes a tapered front end having a smaller diameter than a middle end, the cylindrical middle end extending from the front end by a predetermined length to allow the ball and spring to be accommodated within the middle end, and a rear end stepped from the middle end to have a greater diameter than the middle end, and the valve seat includes a seat head press-fitted into the middle end of the valve housing, a seat body press-fitted into the tapered rear end of the valve housing, and a seat tail press-fitted into the inner stepped portion of the perforated block, whereby the check valve achieves size and weight reduction and is manufactured at low cost and high processing efficiency because it may be manufactured using conventional pressing. Furthermore, as a result of the rear end of the valve housing and the seat tail of the valve seat being supported at both front and rear sides thereof by the perforated block, the check valve achieves easy fixing and assembly thereof, resulting in enhanced assembly reliability.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A check valve of a hydraulic brake system, the check valve comprising a valve housing press-fitted into an inner stepped portion of a perforated hydraulic block, the valve housing defining an inner oil passage, a ball accommodated in the valve housing to open or close the inner oil passage, a spring to elastically support the ball, and a valve seat coupled to the valve housing to guide the spring,
   wherein the valve housing includes a tapered front end having a smaller diameter than a cylindrical middle end, the middle end extending from the front end by a predetermined length to allow the ball and spring to be accommodated within the middle end, a rear end stepped from the middle end to have a greater diameter than the middle end, and a flange circumferentially bent from the rear end to have a greater diameter than the rear end, and
   wherein the valve seat has an outer diameter equal to an inner diameter of the rear end so as to be press-fitted into the rear end of the valve housing, the valve seat including an oil hole penetrating the interior thereof.

2. The check valve according to claim 1, wherein the perforated block further includes an outer stepped portion, and the outer stepped portion is press-deformed to fix the rear end and flange of the valve housing press-fitted into the inner stepped portion.

3. The check valve according to claim 1 or 2, wherein the valve seat is supported at the rear on both sides thereof by a stepped surface of the inner stepped portion of the perforated block.

4. A check valve of a hydraulic brake system, the check valve comprising a valve housing press-fitted into an inner stepped portion of a perforated hydraulic block, the valve housing defining an inner oil passage, a ball accommodated in the valve housing to open or close the inner oil passage, a spring to elastically support the ball, and a valve seat coupled to the valve housing to guide the spring,
   wherein the valve housing includes a tapered front end having a smaller diameter than a cylindrical middle end, the middle end extending from the front end by a predetermined length to allow the ball and spring to be accommodated within the middle end, and a rear end stepped from the middle end to have a greater diameter than the middle end, and
   wherein the valve seat includes a seat head press-fitted into the middle end of the valve housing, a seat body press-fitted into the tapered rear end of the valve housing, and a seat tail press-fitted into the inner stepped portion of the perforated block.

5. The check valve according to claim 4, wherein the perforated block further includes an outer stepped portion, and the outer stepped portion is press-deformed to fix the rear end of the valve housing press-fitted into the inner stepped portion.

6. The check valve according to claim 4 or 5, wherein the valve seat is supported at the rear on both sides thereof by corners of the inner stepped portion of the perforated block.

* * * * *